US008880092B1

(12) United States Patent
Cooley (10) Patent No.: US 8,880,092 B1
(45) Date of Patent: Nov. 4, 2014

(54) USING SMART METERS TO DETERMINE MOBILE WIRELESS COMPUTING DEVICE LOCATION

(75) Inventor: Shaun P. Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 710 days.

(21) Appl. No.: 13/206,486

(22) Filed: Aug. 9, 2011

(51) Int. Cl.
*H04W 24/00* (2009.01)
*H04B 17/00* (2006.01)
*G08B 23/00* (2006.01)

(52) U.S. Cl.
USPC ............... 455/456.1; 455/115.1; 455/115.2; 455/115.3; 455/115.4; 340/870.02

(58) Field of Classification Search
CPC ........................................................ H03C 1/62
USPC ........................................ 455/115.4, 456.1
See application file for complete search history.

(56) References Cited

U.S. PATENT DOCUMENTS 8,594,599 B2 * 11/2013 Cornwall et al. .......... 455/155.1

* cited by examiner

*Primary Examiner* — Huy C Ho
(74) *Attorney, Agent, or Firm* — Brill Law Office; Jeffrey Brill (57) ABSTRACT

Multiple smart meters periodically measure strengths of detected signals generated by fixed position wireless devices. A centrally located location determining system receives this data, and correlates received strengths of the signals generated by the specific fixed position wireless devices with the physical locations of the measuring smart meters. Periodically, updated signal strengths are received, and stored correlations are replaced with updated correlations. Strengths of signals generated by fixed position wireless devices are received from a mobile computing device, as measured by the mobile device. The location determining system compares the signal strengths received from the mobile computing device to the most current strengths of signals of the same fixed position wireless devices, as measured by multiple smart meters, so as to perform triangulation and determine the physical location of the mobile device.

19 Claims, 5 Drawing Sheets

USING SMART METERS TO DETERMINE MOBILE WIRELESS COMPUTING DEVICE LOCATION

TECHNICAL FIELD

This disclosure pertains generally to mobile, wireless computing, and more specifically to using smart meters to determine current locations of mobile wireless computing devices.

BACKGROUND

Mobile computing devices such as smart phones, tablet computers and laptops often provide services to users based on current physical location. One of two mechanisms currently determines the current physical location of a mobile computing device in order to provide location based services. These mechanisms can be classified as providing either "fine" or "coarse" positions respectively. Fine location data is provided by Global Positioning System ("GPS") receivers on the mobile computing devices, whereas course location data is provided by WiFi triangulation and/or cell tower triangulation.

GPS position data is very accurate, but a GPS receiver is slow to acquire a signal, and signals are not available inside most buildings, tunnels, or within urban areas with densely packed high-rises. For these reasons, most mobile devices also make use of WiFi triangulation or cell tower triangulation, to quickly acquire a less accurate location while attempting to acquire a GPS fix. Another concern with GPS data is user privacy. Using GPS data to track and possibly to store the exact locations of mobile device users over time raises major privacy concerns, and has recently become a source of serious user concern.

WiFi triangulation is done by comparing the relative strength of nearby WiFi devices as measured by a mobile device to previously recorded readings. These previous readings were taken by vehicles that recorded signal strengths while being driven through the area. The data recorded by these vehicles is not very accurate because the vehicles can only travel on public streets, and thus often take readings from a location that is further from a given WiFi device than the mobile devices in question. Additionally, the signal measuring vehicles are not able to frequently return to and rescan previously scanned areas, and thus stored readings are often not current. Furthermore, the gathering of WiFi data by a third party is of concern to some WiFi providers and end users.

Some companies supplement the vehicle gathered WiFi data with data recorded by certain mobile devices (e.g., Android devices) as users move around. This new source of data is helpful, but still has shortcomings because the mobile devices might be able to detect many WiFi devices/access points while not being able to obtain a GPS fix.

Cell tower triangulation uses cell phone tower signals rather than WiFi device signals, but is otherwise similar to WiFi triangulation and thus creates the same concerns. Other types of fixed position wireless devices can also be used for triangulation, and such use results in the same concerns as WiFi and/or cell phone tower triangulation.

It would be desirable to address these issues.

SUMMARY

A location determining system uses programmable utility meters (smart meters) to determine the current physical locations of mobile computing devices. A smart meter agent is installed on each of a plurality of programmable utility meters. Each specific one of the plurality of programmable utility meters is located at a specific physical location. Each smart meter agent periodically scans for wireless signals, and detects signals generated by specific fixed position wireless devices. The smart meter agents measure strengths of the detected signals, and glean device identifiers of the specific fixed position wireless devices that generated the detected signals.

The location determining system receives, from the plurality of programmable utility meters, strengths of signals generated by specific fixed position wireless devices, as measured by specific ones of the plurality of programmable utility meters. Device identifiers of the specific fixed position wireless devices that generated the measured signals can also be received. The received strengths of the signals generated by the specific fixed position wireless devices are correlated with the physical locations of the specific ones of the plurality of programmable utility meters that measured the strengths of the signals. The correlations are stored, for example in a database. Periodically, updated strengths of measured signals are received from specific ones of the plurality of programmable utility meters, and stored correlations are replaced with updated correlations based on the received updated signal strengths.

At least one strength of at least one signal generated by at least one fixed position wireless device is received from a mobile computing device, as measured by the mobile computing device at a current physical location. Responsive to receiving the at least one signal strength from the mobile computing device, the most current stored signal strength(s) of the same fixed position wireless device(s) are retrieved, as measured by multiple programmable utility meters at specific physical locations. The location determining system compares 1) the at least one strength of the at least one signal generated by the at least one fixed position wireless device received from the mobile computing device and 2) strengths of signals of the same at least one fixed position wireless device, as measured by multiple programmable utility meters at specific physical locations, so as to perform triangulation and determine the current physical location of the mobile computing device.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
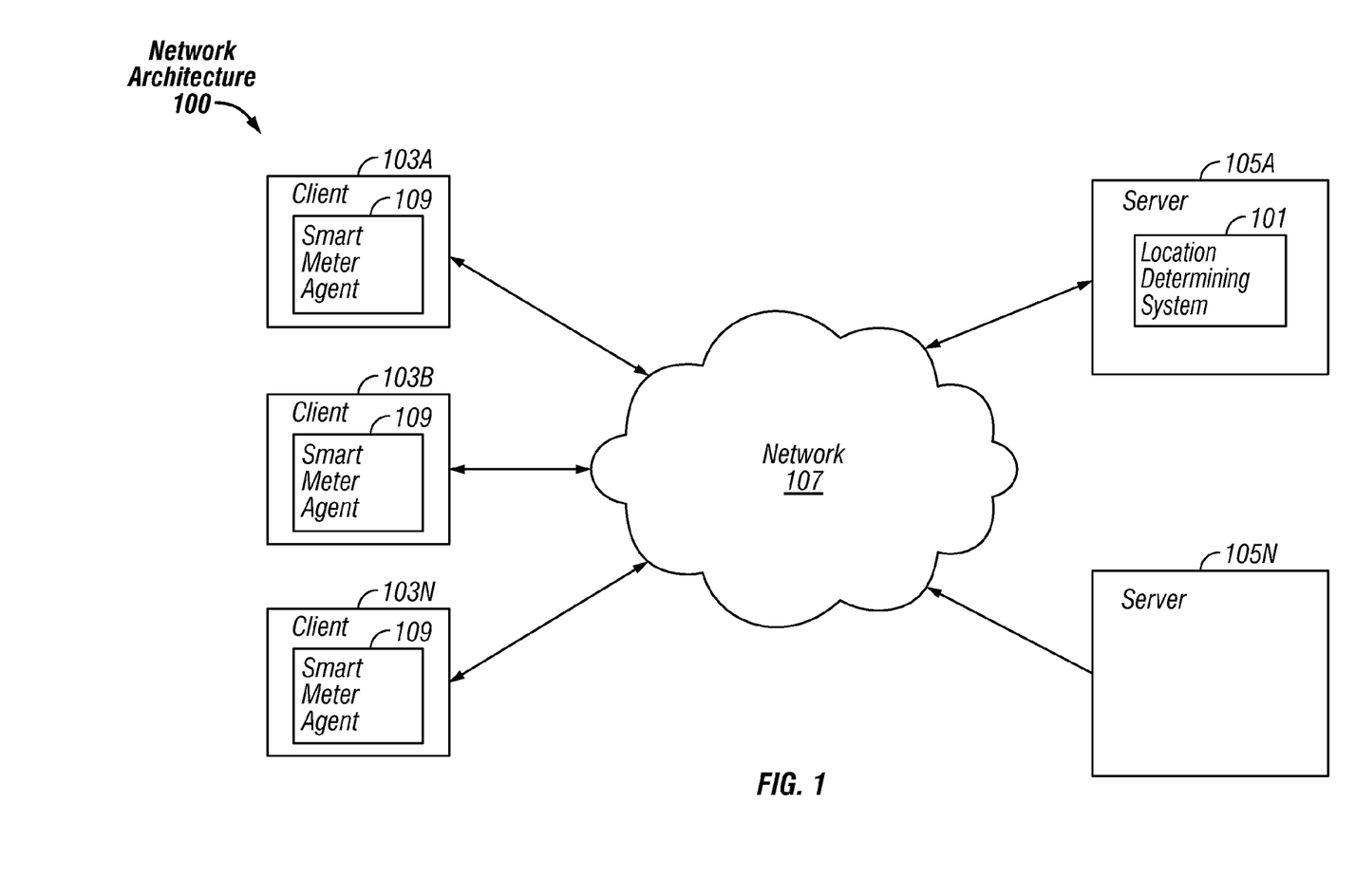
FIG. 1 is a block diagram of an exemplary network architecture in which a location determining system can be implemented, according to some embodiments.

FIG. 1 is a block diagram illustrating an exemplary network architecture 100 in which a location determining system 101 can be implemented. The illustrated network architecture 100 comprises multiple clients 103A, 103B and 103N, as well as multiple servers 105A and 105N. It is to be understood that the clients 103 can be in the form of programmable utility meters 301 (smart meters), which are discussed in detail below in conjunction with FIG. 3. In FIG. 1, the location determining system 101 is illustrated as residing on server 105A, with a smart meter agent 109 deployed on each client 103. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
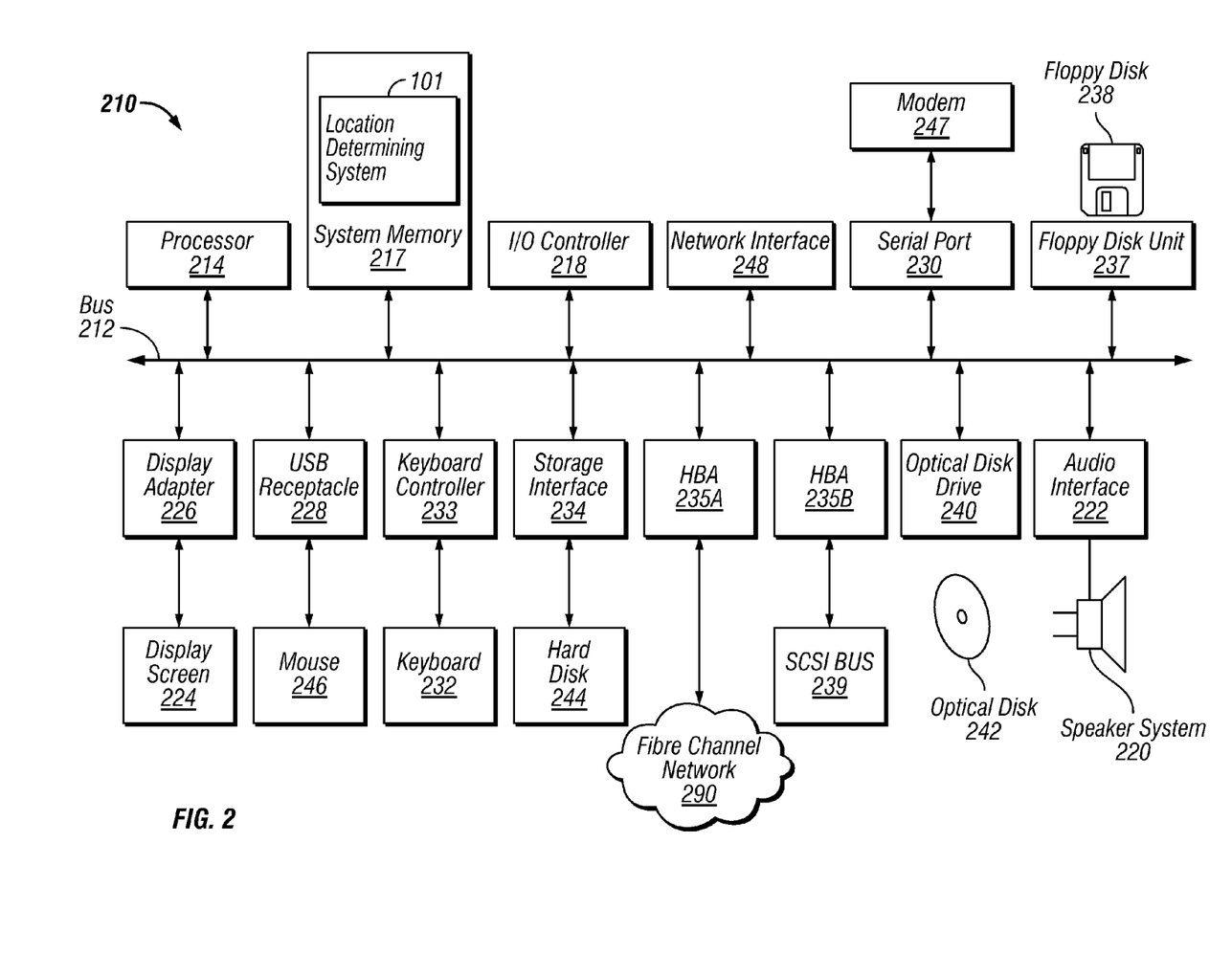
FIG. 2 is a block diagram of a computer system suitable for implementing a location determining system, according to some embodiments.

FIG. 2 is a block diagram of a computer system 210 suitable for implementing a location determining system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the location determining system 101 is illustrated as residing in system memory 217. The workings of the location determining system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
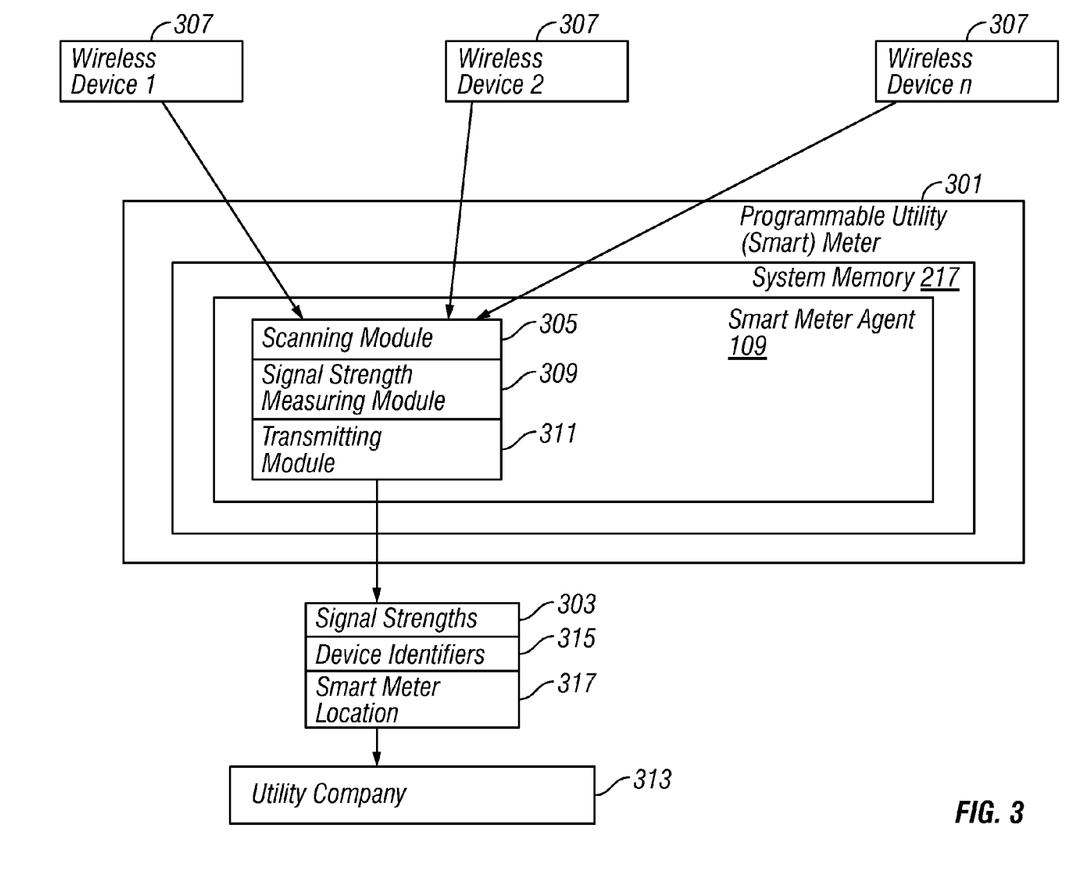
FIG. 3 is a block diagram of the operation of a smart meter agent of a location determining system, according to some embodiments.
Figure 4:
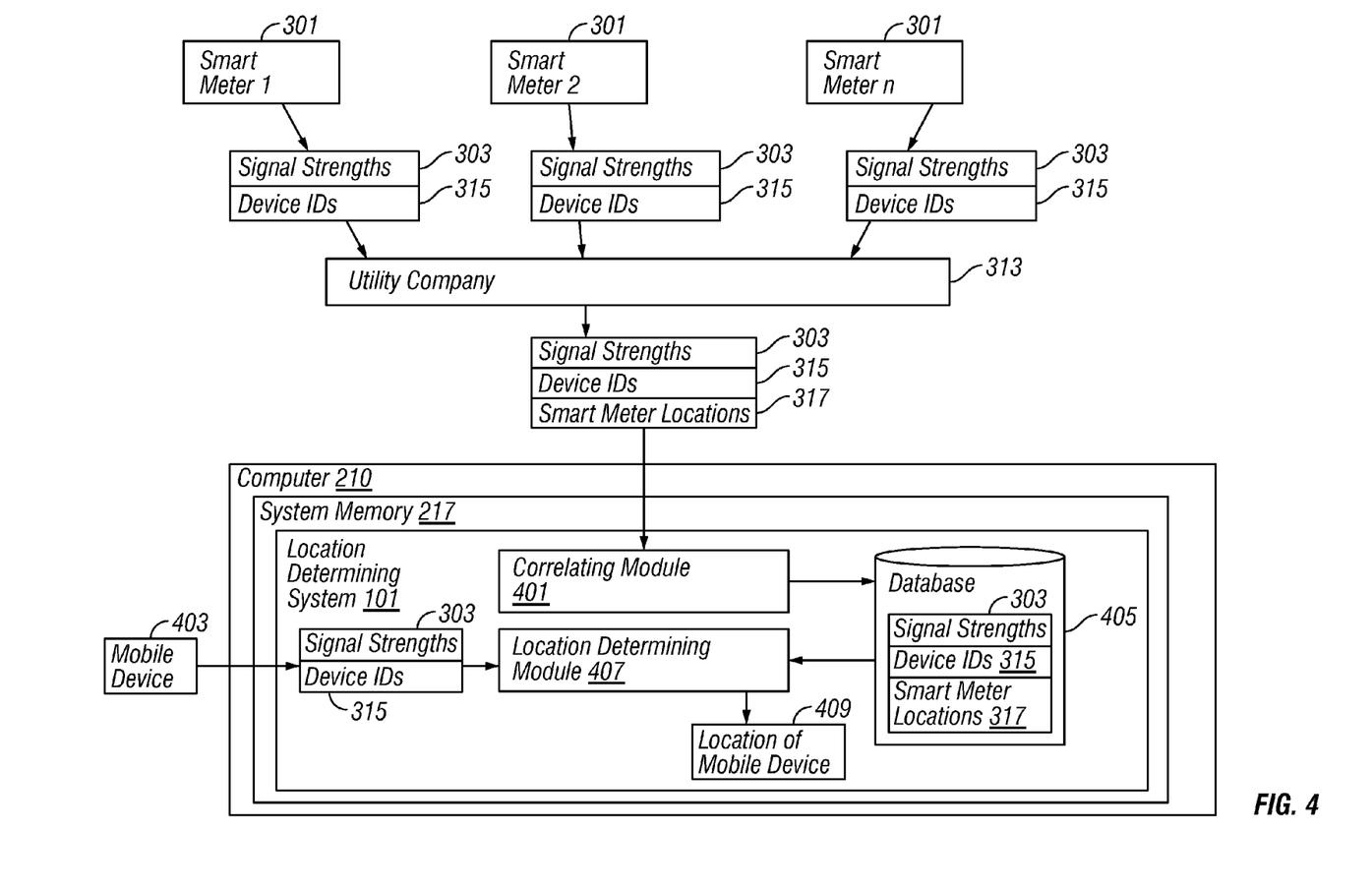
FIG. 4 is a block diagram of the operation of the backend components of a location determining system, according to some embodiments.

FIG. 3 illustrates the operation of a smart meter agent 109 of a location determining system 101 residing in the system memory 217 of a computer 210, according to some embodiments. FIG. 4 illustrates the operation of a location determining system 101 residing in the system memory 217 of a computer 210, according to some embodiments. As described above, the functionalities of the location determining system 101, including those of the smart meter agent 109, can reside on a server 105, a client 103, or be distributed between multiple computer systems 210, including within a cloud-based computing environment in which the functionality of the location determining system 101 is provided as a service over a network 107. It is to be understood that although the location determining system 101 and the smart meter agent 109 are illustrated in FIGS. 3 and 4 as single entities, the illustrated location determining system 101 and smart meter agent 109 represent collections of functionalities, which can be instantiated as a single or multiple modules as desired (an instantiation of specific, multiple modules of the location determining system 101 is illustrated in FIGS. 3 and 4). It is to be understood that the modules of the location determining system 101, including those of the smart meter agent 109, can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the location determining system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the location determining system 101 makes use of smart meters 301 that are widely deployed by various utility providers (electric companies, gas companies, etc.). Smart meters 301 are installed at numerous, known locations (e.g., homes and businesses that purchase electricity, gas, and other metered services). The current generation of smart meters 301 monitor many aspects of the metered service being provided, such as real time power consumption, power outages, etc. These smart meters 301 have wireless capability, which they use to transmit this data back to the utility company via wireless mesh networks (each smart meter 301 communicates with other meters 301 until the data is ultimately delivered to the utility company via a backhaul link). The current generation of smart meters 301 is also programmable, allowing them to perform many additional functions. Accordingly to embodiments of the present invention, this ability to program the smart meters 301 is leveraged to have smart meters 301 measure and record wireless signal strengths 303.

More specifically, a scanning module 305 of the smart meter agent 109 on each smart meter 301 participating in the location determining system 101 periodically scans its surrounding environment and detects wireless signals generated by nearby fixed position wireless devices 307 (e.g., WiFi devices, wireless access points, etc.). When a wireless signal is detected, a signal strength measuring module 309 of the smart meter agent 109 measures the signal strength 303, and a device identifying module 310 of the smart meter agent 109 gleans the device identifier 315 (e.g., SSID or MAC address) of the fixed position wireless device 307 that generated the measured signal. How often a smart meter agent 109 scans its surrounding environment to detect wireless signals is a variable design parameter, and different intervals can be used in different embodiments, or by different smart meter agents 109 in a single embodiment (e.g., every ten minutes, every hour, every four hours, etc.).

It is to be understood that the smart meter agent 109 on each smart meter 301 can detect and measure the signal strength 303 of fixed position wireless devices 307 that transmit on any frequency supported by the smart meter 301. As additional wireless frequencies become utilized by fixed position wireless devices 307, corresponding capabilities can be added to deployed smart meter agents 109, thereby allowing the detection and measurement of a wider range of signals.

A transmitting module 311 of the smart meter agent 109 on each smart meter 301 transmits the measured signal strengths 303 to the utility company 313, as well as the device identifiers 315 of the fixed position wireless devices 307 that generated the measured signals, as part of the transmission of data from the smart meter 301. The transmission of data from the smart meter 301 to the utility company 313 also includes an identification of the originating smart meter 301. The identification of the smart meter 301 either includes its physical location 317, or can be used by the utility company 313 to look up this information, as the physical locations 317 of the smart meters 301 are known.

Turning now to FIG. 4, measured signal strengths 303 and corresponding device identifiers 315 are received by the utility company 313 from a plurality of smart meters 301 deployed at different physical locations. The utility company 313 routes this information to a centralized correlating module 401 of the location determining system 101, along with the physical locations 317 (e.g., physical address, longitude/latitude, GPS coordinates, etc.) of the measuring smart meters 301. It is to be understood that in some embodiments, the centralized components (e.g., correlating module 401) of the location determining system 101 run on one or more computers 210 operated by the utility company 313, whereas in other embodiments they run on computer(s) 210 operated by another party, and receive the above-described information from the utility company's computers 210 (as illustrated).

The correlating module 401 correlates the received recorded signal strengths 303 and device identifiers 315 with the physical locations 317 of the measuring smart meters 301, and stores the correlated data in a database 405 (or other storage mechanism that allows subsequent retrieval). Each time the correlating module 401 receives measured signal strength 303/device identifier 315 data originating from a particular smart meter 301, the correlating module 401 replaces (as opposed to supplementing) any previously stored measured signal strength 303/device identifier 315 data from the same smart meter 301 with the new data. This ensures that any superseded data is purged from the database 405. Because of the density at which smart meters 301 are deployed, as well as the fact that fixed location smart meters 301 repeatedly scan for proximate wireless signals, the measured signal strengths 303 can subsequently be used to compute very accurate current location information for mobile wireless computing devices 403, as described below.

In order to determine the current physical location 409 of a given mobile computing device 403, a location determining module 407 of the location determining system 101 receives measured signal strength 303/device identifier 315 data as captured by the mobile computing device 403 for which it is to determine the current physical location 409. The location determining module 407 then retrieves measured signal strengths 303 of the same fixed position wireless devices 307 (as identified by device identifier 315) from the database 405. The location determining module 407 compares signal strengths 303 measured by the mobile computing device 403 at its current physical location 409 to the signal strengths 303 of the same fixed position wireless devices 307 measured by multiple smart meters 301. The location determining module 407 performs triangulation based on these measurements to calculate a current physical location of the mobile computing device 403. By using smart meters 301, the accuracy of triangulation data can be reduced from 60+ meters (the average distance between streets on either side of a city block) in urban areas to about 15 meters (the average distance between smart meters 301), thereby significantly improving the determination of the current locations of mobile wireless computing devices 403.

Figure 5:
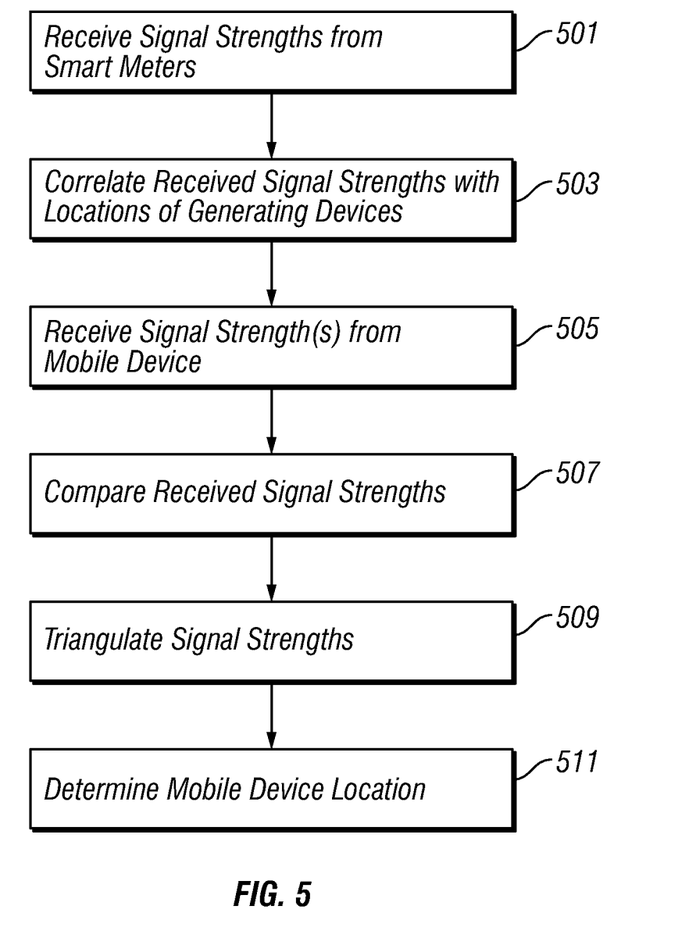
FIG. 5 is a flowchart of the operation of a location determining system, according to some embodiments.

FIG. 5 illustrates steps of the operation of the location determining system 101 (FIG. 1), according to some embodiments. The correlating module 401 (FIG. 4) receives 501 strengths of signals 303 (FIG. 3) generated by specific fixed position wireless devices 307 (FIG. 3), from a plurality of programmable utility meters 301 (FIG. 3). (The strengths of the received signals 303 (FIG. 3) are measured by specific ones of the plurality of programmable utility meters 301 (FIG. 3), at specific physical locations 317 (FIG. 3).) The correlating module 401 (FIG. 4) correlates 503 the received strengths of the signals 303 (FIG. 3) generated by the specific fixed position wireless devices 307 (FIG. 3) with the physical locations 317 (FIG. 3) of the specific ones of the plurality of programmable utility meters 301 (FIG. 3) that measured the strengths of the signals 303 (FIG. 3). The location determining module 407 (FIG. 4) receives 505, from a mobile computing device 403 (FIG. 4), at least one strength of at least one signal generated by at least one fixed position wireless device, the strength of the at least one signal 303 (FIG. 3) being measured by the mobile computing device 403 (FIG. 4) at a current physical location 409 (FIG. 4). The location determining module 407 (FIG. 4) compares 507 1) the at least one strength of the at least one signal 303 (FIG. 3) generated by the at least one fixed position wireless device 307 (FIG. 3) received from the mobile computing device 303 (FIG. 3) and 2) strengths of signals 303 (FIG. 3) of the same at least one fixed position wireless device 307 (FIG. 3), as measured by multiple programmable utility meters 301 (FIG. 3) at specific physical locations 317 (FIG. 3). The location determining module 407 (FIG. 4) triangulates 509 the signal strengths 303 (FIG. 3), and determines 511 the current physical location 409 (FIG. 4) of the mobile computing device 403 (FIG. 4).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for determining a current physical location of a mobile computing device, the method comprising the steps of:
    receiving from a plurality of programmable utility meters, by at least one computer, strengths of signals generated by specific fixed position wireless devices, the strengths of the signals being measured by specific ones of the plurality of programmable utility meters;
    wherein each specific one of the plurality of programmable utility meters is located at a specific physical location;
    correlating, by at least one computer, the received strengths of the signals generated by the specific fixed position wireless devices with the physical locations of the specific ones of the plurality of programmable utility meters that measured the strengths of the signals;
    receiving, from a mobile computing device, by at least one computer, at least one strength of at least one signal generated by at least one fixed position wireless device, the strength of the at least one signal being measured by the mobile computing device at a current physical location; and
    comparing, by at least one computer, 1) the at least one strength of the at least one signal generated by the at least one fixed position wireless device received from the mobile computing device and 2) strengths of signals of the same at least one fixed position wireless device, as measured by multiple programmable utility meters at specific physical locations, so as to perform triangulation and determine the current physical location of the mobile computing device.

2. The method of claim 1 further comprising:
    storing correlations of the received strengths of the signals generated by the specific fixed position wireless devices and the physical locations of the specific ones of the plurality of programmable utility meters that measured the strengths of the signals.

3. The method of claim 2 further comprising:
    periodically receiving, from specific ones of the plurality of programmable utility meters, updated strengths of signals generated by specific fixed position wireless devices, as measured by the specific ones of the plurality of programmable utility meters at specific physical locations; and
    replacing stored correlations of the strengths of the signals generated by the specific fixed position wireless devices, as measured by the specific ones of the plurality of programmable utility meters at the specific physical locations with updated correlations based on the received updated strengths of the signals.

4. The method of claim 2 further comprising:
    responsive to receiving the at least one strength of the at least one signal generated by the at least one fixed position wireless device from the mobile computing device, retrieving stored most current strengths of signals of the same at least one fixed position wireless device, as measured by multiple programmable utility meters at specific physical locations, to perform triangulation and determine the current physical location of the mobile computing device.

5. The method of claim 1 further comprising:
    receiving, from the plurality of programmable utility meters, device identifiers of the specific fixed position wireless devices that generated the measured signals.

6. The method of claim 1 further comprising:
    periodically scanning, by specific ones of the plurality of programmable utility meters, for wireless signals;
    periodically detecting, by specific ones of the plurality of programmable utility meters, signals generated by specific fixed position wireless devices; and
    periodically measuring, by specific ones of the plurality of programmable utility meters, strengths of the detected signals.

7. The method of claim 6 further comprising:
    gleaning, by specific ones of the plurality of programmable utility meters, device identifiers of the specific fixed position wireless devices that generated the detected signals.

8. At least one non-transitory computer readable storage medium storing a computer program product for determining a current physical location of a mobile computing device, the computer program product comprising:
    program code for receiving from a plurality of programmable utility meters strengths of signals generated by specific fixed position wireless devices, the strengths of the signals being measured by specific ones of the plurality of programmable utility meters;
    wherein each specific one of the plurality of programmable utility meters is located at a specific physical location;
    program code for correlating the received strengths of the signals generated by the specific fixed position wireless devices with the physical locations of the specific ones of the plurality of programmable utility meters that measured the strengths of the signals;
    program code for receiving, from a mobile computing device, at least one strength of at least one signal generated by at least one fixed position wireless device, the strength of the at least one signal being measured by the mobile computing device at a current physical location; and program code for comparing 1) the at least one strength of the at least one signal generated by the at least one fixed position wireless device received from the mobile computing device and 2) strengths of signals of the same at least one fixed position wireless device, as measured by multiple programmable utility meters at specific physical locations, so as to perform triangulation and determine the current physical location of the mobile computing device.

9. The computer program product of claim 8 further comprising:

program code for storing correlations of the received strengths of the signals generated by the specific fixed position wireless devices and the physical locations of the specific ones of the plurality of programmable utility meters that measured the strengths of the signals.

10. The computer program product of claim 9 further comprising:

program code for periodically receiving, from specific ones of the plurality of programmable utility meters, updated strengths of signals generated by specific fixed position wireless devices, as measured by the specific ones of the plurality of programmable utility meters at specific physical locations; and program code for replacing stored correlations of the strengths of the signals generated by the specific fixed position wireless devices, as measured by the specific ones of the plurality of programmable utility meters at the specific physical locations with updated correlations based on the received updated strengths of the signals.

11. The computer program product of claim 9 further comprising:

program code for, responsive to receiving the at least one strength of the at least one signal generated by the at least one fixed position wireless device from the mobile computing device, retrieving stored most current strengths of signals of the same at least one fixed position wireless device, as measured by multiple programmable utility meters at specific physical locations, to perform triangulation and determine the current physical location of the mobile computing device.

12. The computer program product of claim 8 further comprising:

program code for receiving, from the plurality of programmable utility meters, device identifiers of the specific fixed position wireless devices that generated the measured signals.

13. The computer program product of claim 8 further comprising:

program code for periodically scanning, by specific ones of the plurality of programmable utility meters, for wireless signals;

program code for periodically detecting, by specific ones of the plurality of programmable utility meters, signals generated by specific fixed position wireless devices; and program code for periodically measuring, by specific ones of the plurality of programmable utility meters, strengths of the detected signals.

14. The computer program product of claim 13 further comprising:

program code for gleaning, by specific ones of the plurality of programmable utility meters, device identifiers of the specific fixed position wireless devices that generated the detected signals.

15. A computer system for determining a current physical location of a mobile computing device, the computer system comprising:

a processor;

system memory;

a correlating module, residing in the system memory, for receiving from a plurality of programmable utility meters strengths of signals generated by specific fixed position wireless devices, the strengths of the signals being measured by specific ones of the plurality of programmable utility meters, and for correlating the received strengths of the signals generated by the specific fixed position wireless devices with the physical locations of the specific ones of the plurality of programmable utility meters that measured the strengths of the signals;

wherein each specific one of the plurality of programmable utility meters is located at a specific physical location; and a location determining module, residing in the system memory, for receiving, from a mobile computing device, at least one strength of at least one signal generated by at least one fixed position wireless device, the strength of the at least one signal being measured by the mobile computing device at a current physical location, and for comparing 1) the at least one strength of the at least one signal generated by the at least one fixed position wireless device received from the mobile computing device and 2) strengths of signals of the same at least one fixed position wireless device, as measured by multiple programmable utility meters at specific physical locations, so as to perform triangulation and determine the current physical location of the mobile computing device.

16. The computer system of claim 15 wherein the correlating module is further configured for:

storing correlations of the received strengths of the signals generated by the specific fixed position wireless devices and the physical locations of the specific ones of the plurality of programmable utility meters that measured the strengths of the signals.

17. The computer system of claim 16 wherein the correlating module is further configured for:

periodically receiving, from specific ones of the plurality of programmable utility meters, updated strengths of signals generated by specific fixed position wireless devices, as measured by the specific ones of the plurality of programmable utility meters at specific physical locations; and replacing stored correlations of the strengths of the signals generated by the specific fixed position wireless devices, as measured by the specific ones of the plurality of programmable utility meters at the specific physical locations with updated correlations based on the received updated strengths of the signals.

18. The computer system of claim 16 wherein the correlating module is further configured for:

responsive to receiving the at least one strength of the at least one signal generated by the at least one fixed position wireless device from the mobile computing device, retrieving stored most current strengths of signals of the same at least one fixed position wireless device, as measured by multiple programmable utility meters at specific physical locations, to perform triangulation and determine the current physical location of the mobile computing device.

19. The computer system of claim 15 wherein the correlating module is further configured for:

receiving, from the plurality of programmable utility meters, device identifiers of the specific fixed position wireless devices that generated the measured signals.

\* \* \* \* \*